United States Patent
Moon et al.

(10) Patent No.: US 9,014,463 B2
(45) Date of Patent: Apr. 21, 2015

(54) SYSTEM FOR REAL-TIME STEREO MATCHING

(71) Applicant: Kyungpook National University Industry-Academic Cooperation Foundation, Daegu (KR)

(72) Inventors: Byung In Moon, Seoul (KR); Seung-Ho Ok, Busan (KR); Kyeong-ryeol Bae, Daegu (KR); Hyeon-Sik Son, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 193 days.

(21) Appl. No.: 13/681,455

(22) Filed: Nov. 20, 2012

(65) Prior Publication Data

US 2013/0136339 A1    May 30, 2013

(30) Foreign Application Priority Data

Nov. 25, 2011  (KR) ................ 10-2011-0124203
Nov. 14, 2012  (KR) ................ 10-2012-0128809

(51) Int. Cl.
*G06K 9/00*  (2006.01)
*G06K 9/62*  (2006.01)
*G06T 7/00*  (2006.01)

(52) U.S. Cl.
CPC .............. *G06K 9/62* (2013.01); *G06K 9/00208* (2013.01); *G06T 7/0075* (2013.01); *G06T 2207/10021* (2013.01)

(58) Field of Classification Search
USPC .................................. 345/419; 382/154, 285
See application file for complete search history.

(56) References Cited

U.S. PATENT DOCUMENTS

| | | | |
|---|---|---|---|
| 8,428,342 B2* | 4/2013 | Tian et al. ................ | 382/154 |
| 8,761,491 B2* | 6/2014 | Chen et al. ................ | 382/154 |
| 8,787,654 B2* | 7/2014 | Zhang et al. .............. | 382/154 |
| 2006/0056727 A1* | 3/2006 | Jones et al. ................ | 382/276 |
| 2010/0220932 A1* | 9/2010 | Zhang et al. .............. | 382/209 |
| 2011/0032341 A1* | 2/2011 | Ignatov et al. ............. | 348/51 |
| 2011/0148868 A1* | 6/2011 | Chang et al. .............. | 345/419 |
| 2013/0038600 A1* | 2/2013 | Wang ....................... | 345/419 |
| 2013/0077852 A1* | 3/2013 | Chang et al. .............. | 382/154 |
| 2013/0136339 A1* | 5/2013 | Moon et al. ............... | 382/154 |
| 2014/0177927 A1* | 6/2014 | Shieh et al. ............... | 382/108 |

\* cited by examiner

*Primary Examiner* — Gregory M Desire
(74) *Attorney, Agent, or Firm* — Porzio, Bromberg & Newman, P.C.

(57) ABSTRACT

A system for real-time stereo matching is provided, which provides improved stereo matching speed and rate by gradually optimizing a disparity range used in the stereo matching based on the stereo matching result of the previous frame image and thus reducing unnecessary matching computations.

10 Claims, 10 Drawing Sheets

FIG. 8

SYSTEM FOR REAL-TIME STEREO MATCHING

CROSS-REFERENCE TO RELATED APPLICATIONS

This application claims priority from Korean Patent Application Nos. 10-2011-0124203 and 10-2012-0128809, respectively filed on filed on Nov. 25, 2011 and Nov. 14, 2012, in the Korean Intellectual Property Office, the disclosure of which is incorporated herein by reference in its entirety.

BACKGROUND

1. Field of the Invention

The present invention relates to a system for real-time stereo matching, and more particularly, to a system for stereo matching which provides improved stereo matching speed and matching rate by gradually optimizing a disparity range for stereo matching using a stereo matching result of a previous frame image and thus reducing unnecessary computations for matching.

2. Description of the Related Art

Stereo matching is the technique that is used to acquire 3-dimensional information from two or more 2-dimensional images acquired from different locations at the same time, and relates to a series of correspondence problems for finding points corresponding to the same location of the two images (i.e., left/right images) and acquiring disparity information between the two corresponding points to thus acquire 3D depth information.

Solutions to the correspondence problems are mainly categorized into a feature-based matching and an area-based matching. The feature-based matching conducts matching at specific regions such as vertex or borders, but is unable to provide information about the rest regions other than the specific regions. The area-based matching finds corresponding points of the entire image by measuring internal correlativity of a predetermined size of window on the same parallel line of the left/right images, and thus provides dense 3D information.

FIG. 1 illustrates a conventional area-based matching which uses a predetermined window size and a predetermined disparity range. Referring to an example illustrated in FIG. 1, the point of the highest correlativity is found within a range between points B and B', which is a predetermined disparity range, to find a corresponding location in the right image to the location A of the left image. In another example, the point of the highest correlativity is found within a predetermined disparity range between points D and D' to find a corresponding location in the right image with respect to location C. Various methods including sum of absolute difference (SAD), sum of squared difference (SSD), normalized correlation (NCC) and census transform are employed to measure internal correlation of the predetermined window areas within the left/right images. However, because these schemes have to measure the correlativity across the entire region of the image, the computational cost to find the corresponding location rapidly increases as the disparity range to measure the correlativity along the same parallel lines of the left/right images increases, and also more time is consumed to acquire 3D information.

The conventional area-based stereo matching thus employs a way of removing redundant computations during measuring of internal correlativity in the window region and a way of predicting a disparity range of the search region to measure correlativity, to reduce need for computation and time for matching.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

Thus, a technical objective is to provide a system for stereo matching which improves matching speed and rate by gradually optimizing a disparity range in a search region to measure correlativity on the same parallel lines of left/right images and thus reducing unnecessary computations for the matching.

Another technical objective is to provide a system for stereo matching which is capable of improving stereo matching rate under dynamic environment by additionally referring to motion vector information generated as a result of matching successive image data, during setup of the disparity range for use in the current stereo matching based on the stereo matching result regarding the previous frame image.

In one embodiment, a system for stereo matching is provided, which may include a depth map generator which generates depth map information based on a stereo matching result of a N frame image, a disparity range controller which generates disparity range information using the depth map information, and a stereo matching unit which performs stereo matching computations of N+1 frame image using the disparity range information.

The disparity range controller may perform a series of window-based filtering computations using the depth map information.

The disparity range controller may include a base disparity setup unit which performs a series of filtering computations using the depth map information and sets a base disparity value based on the same, and an offset disparity setup unit which performs a series of filtering computations using the depth map information and sets an offset disparity value based on the same.

The disparity range controller may additionally include an initial base disparity value range storage which stores a base disparity value range as initially set, and an initial offset disparity value range storage which stores an offset disparity value range as initially set.

The disparity range controller may additionally include a depth map reliability determining unit which determines reliability of the depth map information.

The disparity range controller may include a first multiplexer (MUX) which may select an initial base disparity value range or a base disparity value as set at the base disparity setup unit, depending on the reliability of the depth map information, and a second multiplexer (MUX) which may select an initial offset disparity value range or an offset disparity value as set at the offset disparity setup unit, depending on the reliability of the depth map information.

In another embodiment, the system the stereo matching may additionally include a motion vector generator which generates motion vector information using image information in a predetermined direction of N frame and N+1 frame, and the disparity range controller may generate disparity range information by additionally using the motion vector information.

The disparity range controller may perform a series of window-based filtering computations using the depth map information.

The disparity range controller may include a base disparity setup unit which performs a series of filtering computations using the depth map information and the motion vector information and sets a base disparity value based on the same, and an offset disparity setup unit which performs a series of filtering computations using the depth map and sets an offset disparity value based on the same.

The disparity range controller may additionally include an initial base disparity value range storage which stores a base disparity value range as initially set, and an initial offset disparity value range storage which stores an offset disparity value range as initially set.

The disparity range controller may additionally include a depth map reliability determining unit which determines reliability of the depth map information.

The disparity range controller may include a first multiplexer (MUX) which may select an initial base disparity value range or a base disparity value as set at the base disparity setup unit, depending on the reliability of the depth map information, and a second multiplexer (MUX) which may select an initial offset disparity value range or an offset disparity value as set at the offset disparity setup unit, depending on the reliability of the depth map information.

According to the embodiments, because unnecessary computations are reduced by gradually optimizing the disparity range based on the stereo matching result of the previous frame image, matching speed is increased and because correlativity of unnecessary area is not measured, the matching error is minimized and matching rate is increased.

It is particularly possible to further increase the stereo matching rate by additionally referring to the motion vector information generated as a result of matching the image data of the previous and current frames.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 8 is a view provided to explain a concept of generating a motion vector component according to yet another embodiment;

DETAILED DESCRIPTION OF EXEMPLARY EMBODIMENTS

Figure 1:
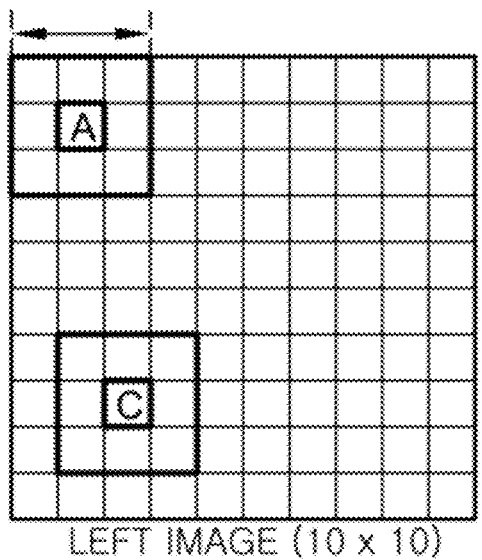
FIG. 1 illustrates a conventional area-based matching which uses a predetermined window size and a predetermined disparity range.
Figure 1:
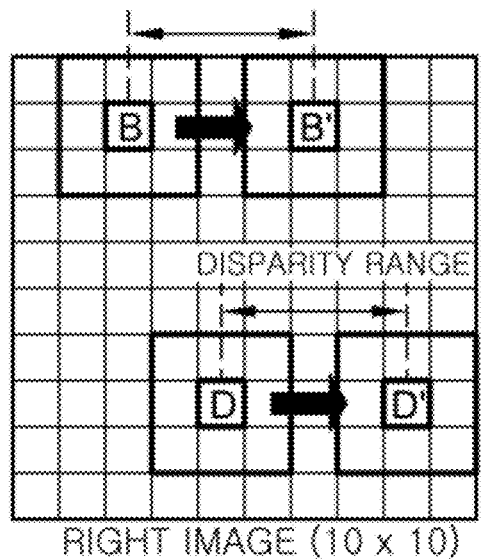

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Although the terms such as "first" or "second" may be used to explain various components, the components should not be limited by the terms. The terms are used purely for the purpose of distinguishing one component from the other.

Certain terminologies are used throughout the description to explain specific embodiments and not to be construed as limiting the invention. Unless otherwise expressed explicitly, a singular term includes a plural meaning. Throughout the description, the terms such as "comprise" or "has" may designate existence of certain characteristic, number, step, operation, component, part or a combination thereof, and not to be construed as precluding existence or possible addition of one or more of the other characteristics, numbers, steps, operations, components, parts or a combination thereof.

The invention will be explained below with reference to embodiments.

Figure 2:
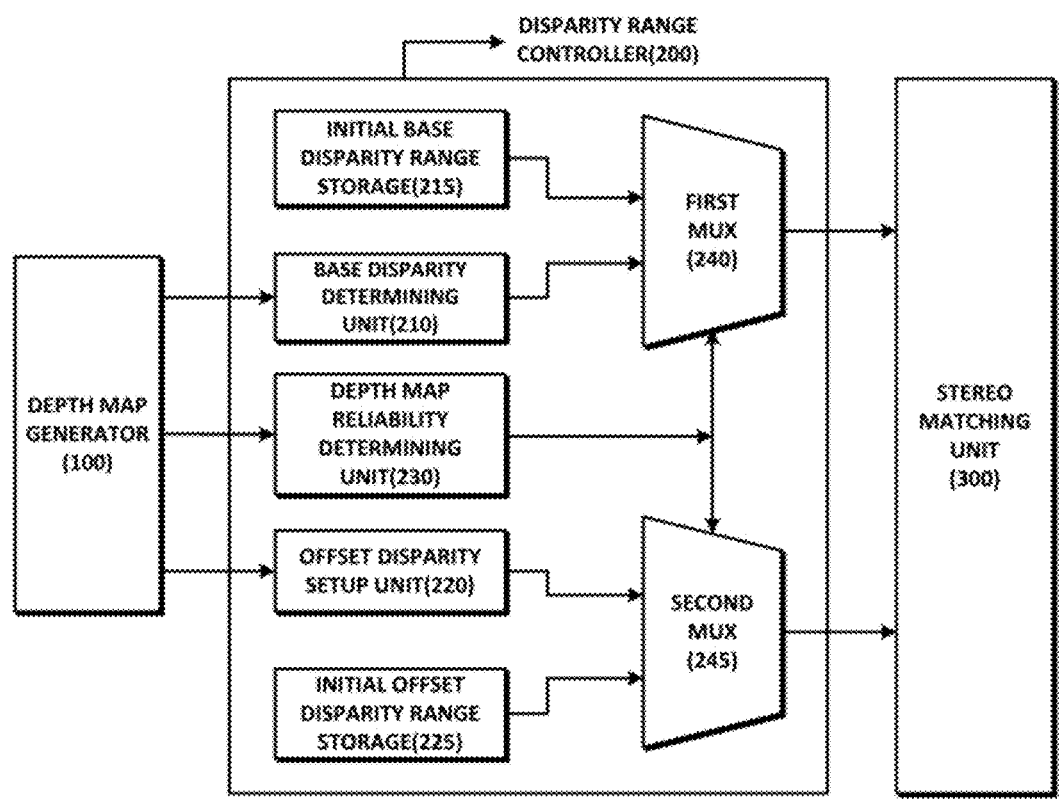
FIG. 2 illustrates a stereo matching system according to an embodiment.

FIG. 2 illustrates a stereo matching system according to an embodiment.

Referring to FIG. 2, a stereo matching system according to a preferred applicable embodiment includes a depth map generator 100 which generates depth map information from the result of stereo matching of N frame image, a disparity range controller 200 which generates disparity range information using the depth map information, and a stereo matching unit 300 which performs computations for stereo matching of N+1 frame image using the disparity range (N=natural number).

The depth map generator 100 generates depth map information by stereo-matching the N frame image data. In one embodiment, the depth map generator 100 may generate depth map information by performing stereo matching computation with left and right image data. The depth map information, generated in the manner explained above, may be stored at a depth map storage (not illustrated) and retrieved from the depth map storage to be used whenever necessary.

The disparity range controller 200 generates disparity range information necessary for the computation for stereo matching, by using the depth map information generated at the depth map generator 100. The disparity range controller 200 may perform a series of window-based filtering computations using the depth map information. By doing so, it is possible to remove noise from the image data and reduce memory size to store data.

In one embodiment, the disparity range controller 200 may include a base disparity setup unit 210 which performs a series of filtering computations using the depth map information and sets a base disparity value range based on the result, and an offset disparity setup unit 220 which performs a series of filtering computations using the depth map information and sets an offset disparity value based on the result. The base disparity setup unit 210 and the offset disparity setup unit 220 can remove noise and reduce memory size for data storage.

As used herein, the term "base disparity value" refers to a size of base disparity value used to find a corresponding point between the left/right images regarding a specific point. As used herein, the term "offset disparity value" refers to a disparity error corresponding to a predetermined size in the left/right directions with reference to the base disparity value. Accordingly, in one embodiment, the disparity range information generated based on the depth map information of the previous frame image, including the base disparity value information and the offset disparity value information, may set a disparity range for the stereo matching computation. This will be explained in greater detail below with reference to FIG. 3.

Figure 3:
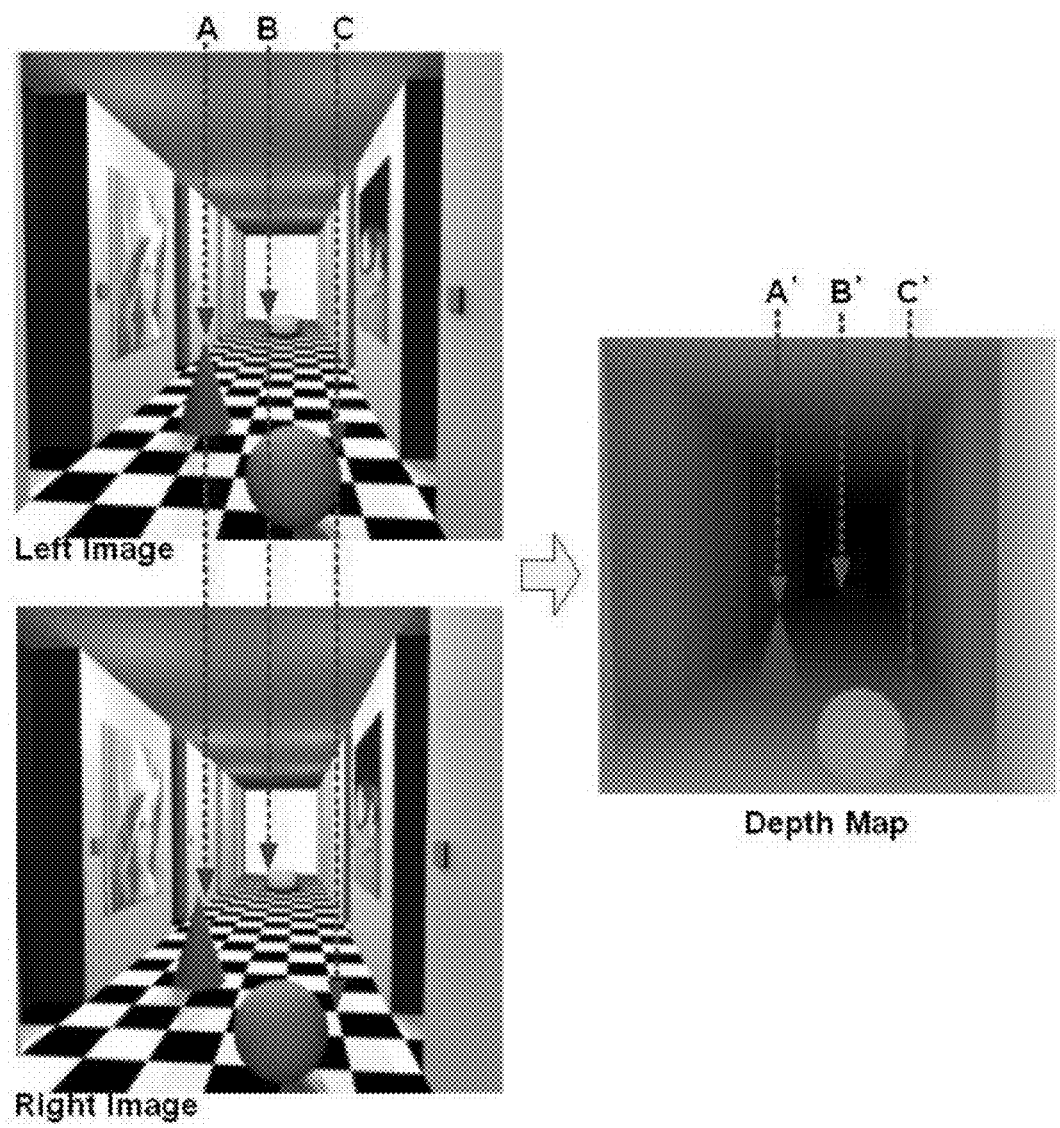
FIG. 3 illustrates left/right images captured at a stereo camera and a depth map as a result of matching the left/right images.

FIG. 3 illustrates left/right images captured at a stereo camera and a depth map as a result of matching the left/right images.

Referring to FIG. 3, the characteristics of points A, B, C are such that, while there is almost no disparity between the left/right images at point B, which is the farthest point, the disparity is the highest between the left/right images at point C, which is the nearest. Referring to the depth map as a result of the matching, the farthest point B, i.e., the point with the least disparity has the darkest value, while the nearest point C, i.e., the point with the greatest disparity has the brightest value.

In a stereo vision system that acquires successive images real-time, the depth map information of the previous frame image has quite similar characteristics as those of the depth map information of the next frame image. It is therefore possible to increase matching speed and rate by reducing unnecessary computations for the stereo matching, by gradually optimizing the disparity range used for the stereo matching using such characteristics.

Figure 4:
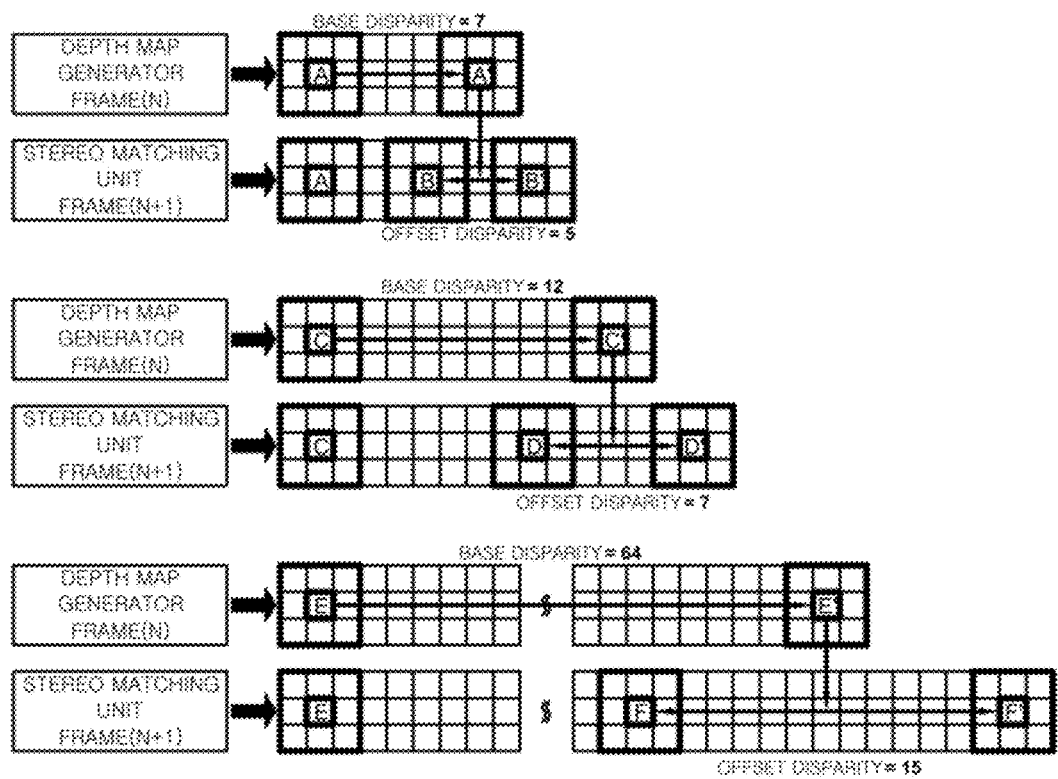
FIG. 4 illustrates a method for setting a disparity range at a disparity range controller according to an embodiment.

FIG. 4 illustrates a method for setting a disparity range at a disparity range controller according to an embodiment.

Referring to FIG. 4, in one embodiment, to find a corresponding point of a specific point, it is possible to utilize a base disparity value which is set using the depth map information, the result of stereo matching of the previous frame image. It is also possible to set an offset disparity value range based on a predetermined range with reference to the base disparity value, using an offset disparity value set with reference to the depth map information. The offset disparity value may be set in relation to the size of disparity, by referring to the depth map information of the previous frame image.

Referring to an embodiment illustrated in FIG. 4, for the disparity range information at point A, the base disparity value is set to 7 and the offset disparity value is set to 5, using the depth map information of the N frame. Accordingly, in one embodiment, it is possible to perform stereo matching by setting a disparity range between points B and B' using the base disparity value and the offset disparity value. For points C and E, it is possible to perform stereo matching by setting disparity ranges in the same manner as explained above with reference to point A.

Referring to FIG. 4, from the base disparity values and the offset disparity values at the respective points, it is clear that the base disparity value is relatively smaller in consideration of the fact that the disparity is not larger at point A when compared to point E, and also in consideration of the fact that the offset disparity value is also set to be small in an anticipation of relatively small variation of the disparity in the next frame image. Note that the base disparity values and the offset disparity values at the respective points (FIG. 4) are set for the purpose of explaining the stereo matching computation, but different base disparity values and offset disparity values may be implemented in another embodiment.

Figure 5:
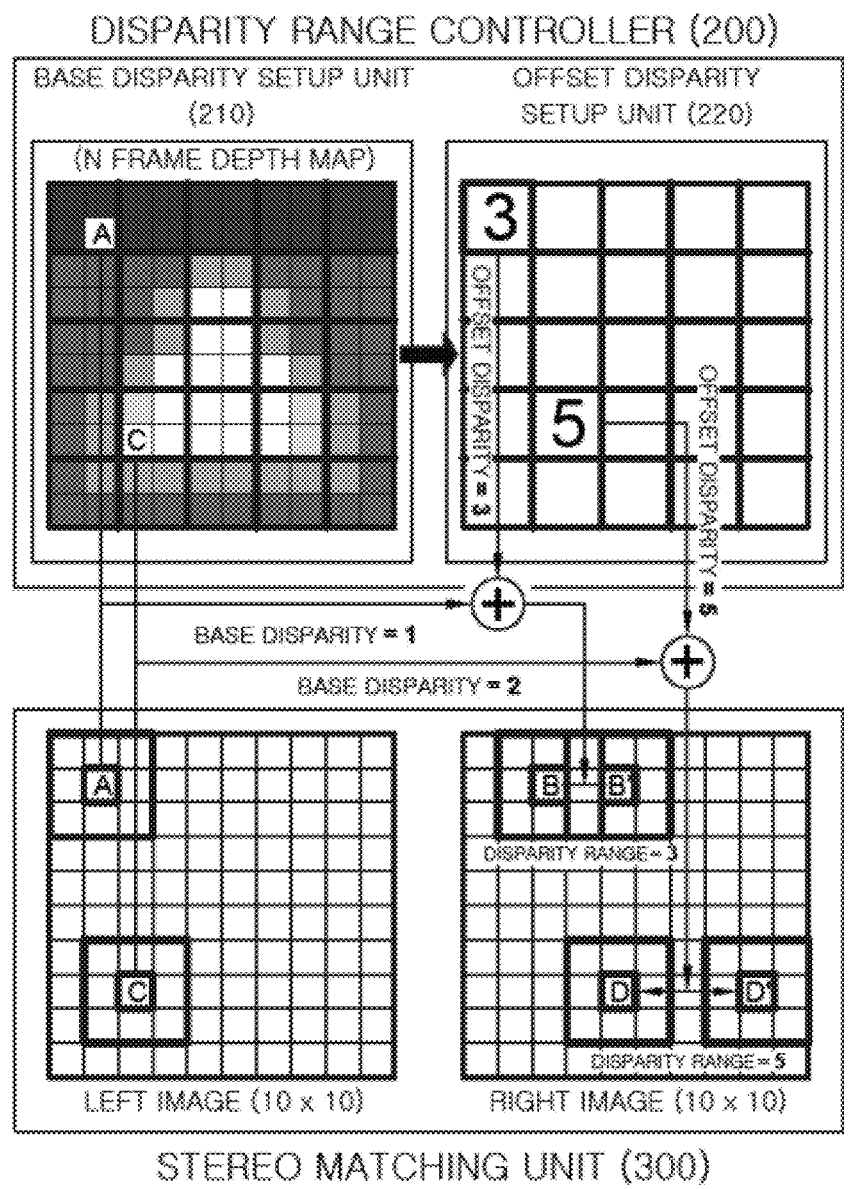
FIG. 5 illustrates a method for processing stereo matching computations at a stereo matching unit according to an embodiment.

FIG. 5 illustrates a method for processing stereo matching computations at a stereo matching unit according to an embodiment.

Referring to FIG. 5, the base disparity setup unit 210 is a module provided to set a base disparity value to be used in the stereo matching of the next frame image based on the depth map information, which is the result of the stereo matching of the previous frame image, and a predetermined size window may be designated to remove noise and reduce memory size for data storage. The base disparity value is generated from the depth map of the previous frame image, and it is possible to set the window size from 1×1, which is one-pixel unit of the image. In one embodiment, a 2×2 size window is applied for the base disparity setup unit 210 and the internal data of the window may be applied as the same value through a series of filtering computations, although not limited thereto.

The offset disparity setup unit 220 is a module provided to set an offset disparity value to be used in the stereo matching of the next frame image, and like the base disparity setup unit 210, a predetermined size window may be applied. The offset disparity value may be set in a manner in which a value relative to a variation is applied with reference to the base disparity value corresponding to the window. In one embodiment, point A which is dark has a narrow disparity, and point C which is bright has a wide disparity. Therefore, the offset disparity value of point C may be set relatively greater than the offset disparity value at point A. The offset disparity values may be set according to various embodiments.

Referring to an embodiment illustrated in FIG. 5, when the depth map information is acquired from the stereo matching result of the previous frame image, the base disparity setup unit 210 sets a base disparity value using the depth map information, and the offset disparity setup unit 220 sets an offset disparity value using the depth map information. A disparity range necessary for the stereo matching is thus set using the base disparity value and the offset disparity value, for the stereo matching of the currently incoming image.

In the particular embodiment illustrated in FIG. 5, in order to find a corresponding point at point A of left image, the base disparity setup unit 210 outputs a base disparity value of 1, and the offset disparity setup unit 220 outputs an offset disparity value of 3, so that a disparity range between points B and B' in the left/right directions with reference to the point of base disparity value is set as much as the offset disparity value and thus the stereo matching is performed. Concerning point C, because disparity is greater at point C than point A based on the depth map information, the wider offset disparity value range is set to find the corresponding point of point C.

The base disparity values and the offset disparity values, generated in correspondence with the respective points or a predetermined size of window, may be stored at a base disparity value storage (not illustrated) and an offset disparity value storage (not illustrated), and retrieved from the base disparity value storage and the offset disparity value storage and used whenever necessary.

In one embodiment, the disparity range controller 200 may additionally include an initial base disparity value range storage 215 which stores a base disparity value range as initially set, and an initial offset disparity value range storage 225 which stores an offset disparity value range as initially set. The initial base disparity value range storage 215 and the initial offset disparity value range storage 225 may store the initial base disparity value range and the initial offset disparity value range to use in case it is impossible to utilize the base disparity values and the offset disparity values extracted from the depth map information.

In one embodiment, the disparity range controller 200 may additionally include a depth map reliability determining unit 230 which determines reliability of the depth map information. The depth map reliability determining unit 230 may determine if it is possible to utilize the collected depth map information by using a preset threshold value. The threshold value may be implemented based on a value to determine a noise of the depth map and matching error.

In one embodiment, the disparity range controller 200 may additionally include a first MUX 240 which may select the initial base disparity value range or a base disparity value as set at the base disparity setup unit 210 depending on the reliability of the depth map information, and a second MUX 245 which may select an initial offset disparity value range or an offset disparity value as set at the offset disparity setup unit 220 depending on the reliability of the depth map information. To be specific, if determining through the depth map reliability determining unit 230 that the depth map information is utilizable, the first and second MUXes 240, 245 may cause the stereo matching computations to be performed by utilizing the base disparity value and the offset disparity value as set at the base disparity setup unit 210 and the offset disparity setup unit 220. On the contrary, that is, if determining through the depth map reliability determining unit 230 that the depth map information is non-utilizable, the first and second MUXes 240, 245 may cause the stereo matching computations to be performed by utilizing the initial base disparity value range and the initial offset disparity value range.

Accordingly, if the reliability of the depth map information of the previous image is below a threshold, or if the stereo matching is processed for the first time, the stereo matching computations may be performed using the initial base disparity value range and the initial offset disparity value range.

Figure 6:
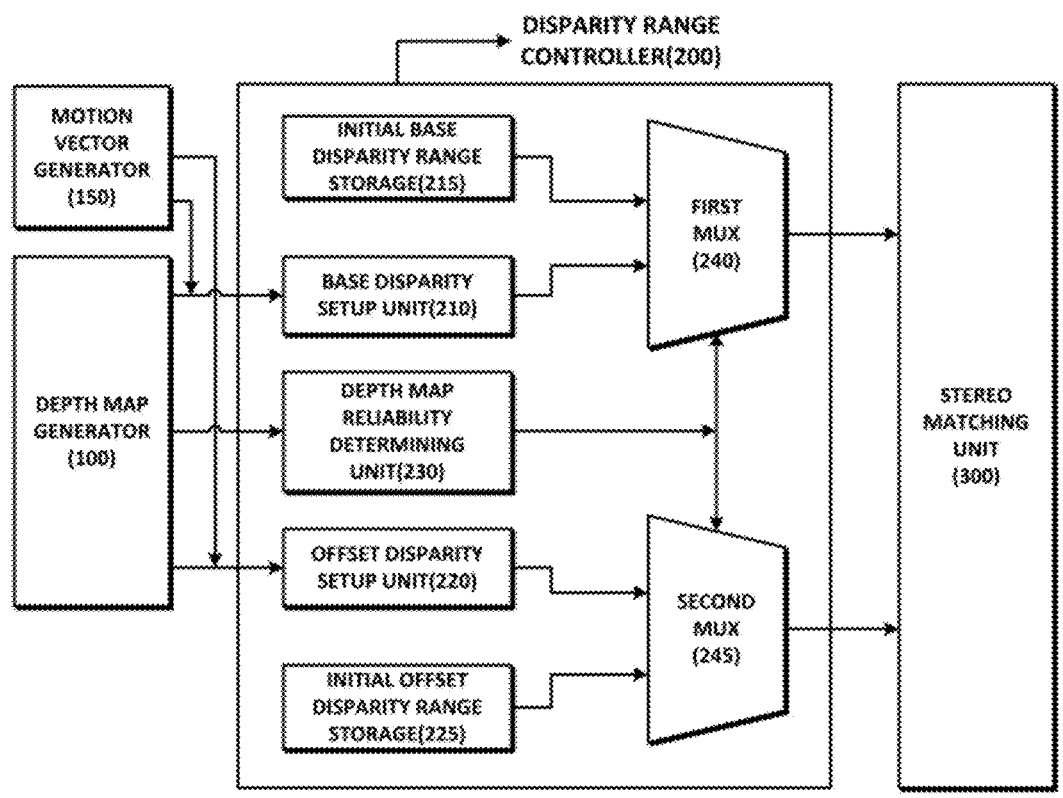
FIG. 6 illustrates a stereo matching system according to another embodiment.

FIG. 6 illustrates a stereo matching system according to another embodiment.

Referring to FIG. 6, in one embodiment, the stereo matching system may additionally include a motion vector generator 150 which generates motion vector information using image information of N frame and N+1 frame in a predetermined direction, and the disparity range controller 200 may generate the disparity range information by additionally using the motion vector information.

In one embodiment, the motion vector generator 150 may generate a motion vector using the left image data of N frame and the left image data of N+1 frame. In another embodiment, the motion vector generator 150 may generate a motion vector using the right image data of N frame and the right image data of N+1 frame. The present invention relates to a technology with technical characteristic in which motion vector information is generated using image information of a predetermined direction, and therefore, should not be limited to the above-mentioned specific example only.

Figure 7:
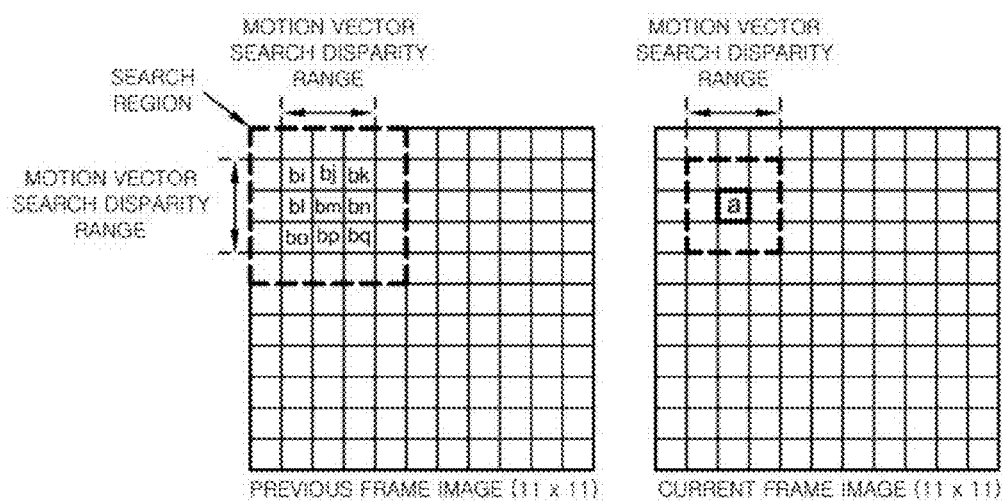
FIG. 7 is a view provided to explain a concept of generating a motion vector component according to another embodiment.

FIG. 7 is a view provided to explain a concept of generating a motion vector component according to another embodiment.

Referring to FIG. 7, in one embodiment, stereo matching may be performed within a predetermined search area of the previous frame image, to extract the motion vector information of a specific window of the current frame image. That is, the stereo matching may be performed in window pixels bi~bq in the previous frame image, to extract the motion vector of window center pixel a of the current frame image.

The search area for the extraction of the motion vector may be preset or set based on a user-input value.

Figure 8:
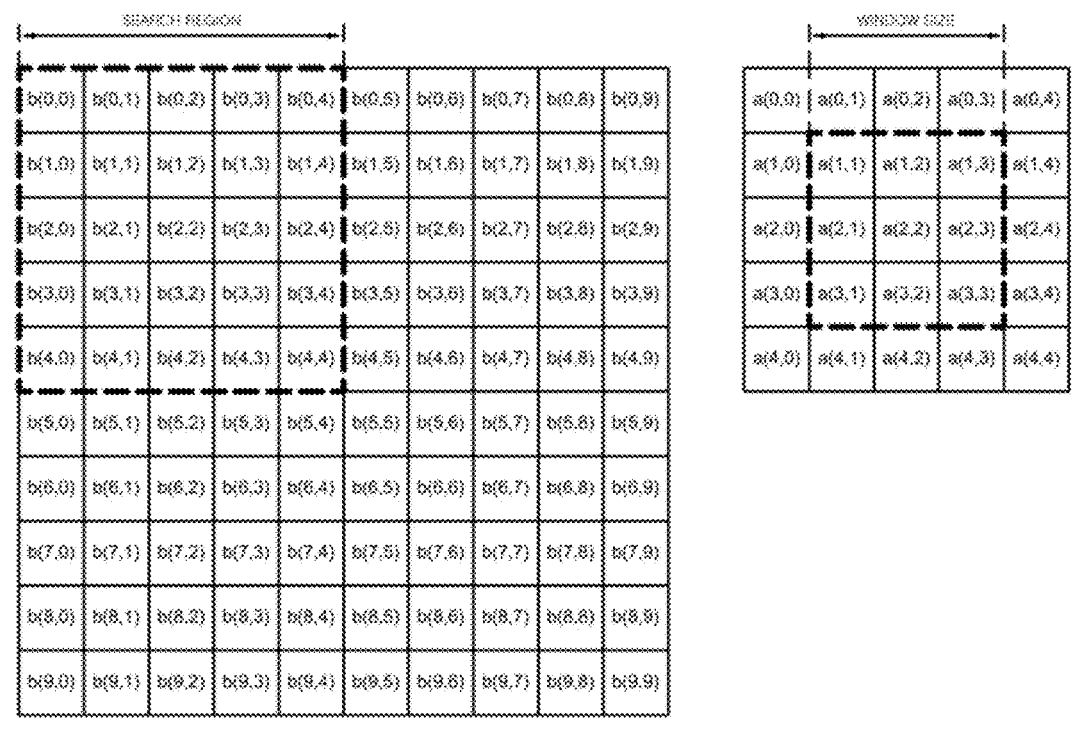

Referring to FIG. 8, the motion vector (u, v) may be extracted as expressed below:

$$SAD(u, v) = \sum_{i=0}^{N-1}\sum_{j=0}^{N-1} |a(i, j) - b(i + u, j + v)| \quad \text{[Mathematical expression 1]}$$

where u and v ranges may be set by:

$$\tfrac{1}{2}p \le u, v \le \tfrac{1}{2}p \quad \text{[Mathematical expression 2]}$$

Referring to the embodiment illustrated in FIG. 8, p=2, and as a result of performing stereo matching within the ranges of u and v, respectively, the u and v values at the maximum matching locations are the final vectors. By way of example, if the window center pixel is at location a(2, 2) in the current image frame, and the center pixel is at location b(1, 1) in the maximum matching window as a result of performing stereo matching computations, the final vector (u, v) at a(2, 2) is (−1, −1). The motion vector information, generated in correspondence with the respective points or a predetermined size of window in the manner explained above, may be stored at a motion vector storage (not illustrated) and retrieved from the motion vector storage and utilized whenever necessary. Referring to the embodiment of FIG. 8, the final vector (u,v) at a(2, 2) may be stored at location a(2, 2) of the motion vector storage.

Although Mathematical Expression 1 expressing a sum of absolute difference (SAD) algorithm that is generally used for the area-based stereo matching is implemented above, a matching algorithm that may be implemented for the present invention is not limited to the specific example given above.

Figure 9:
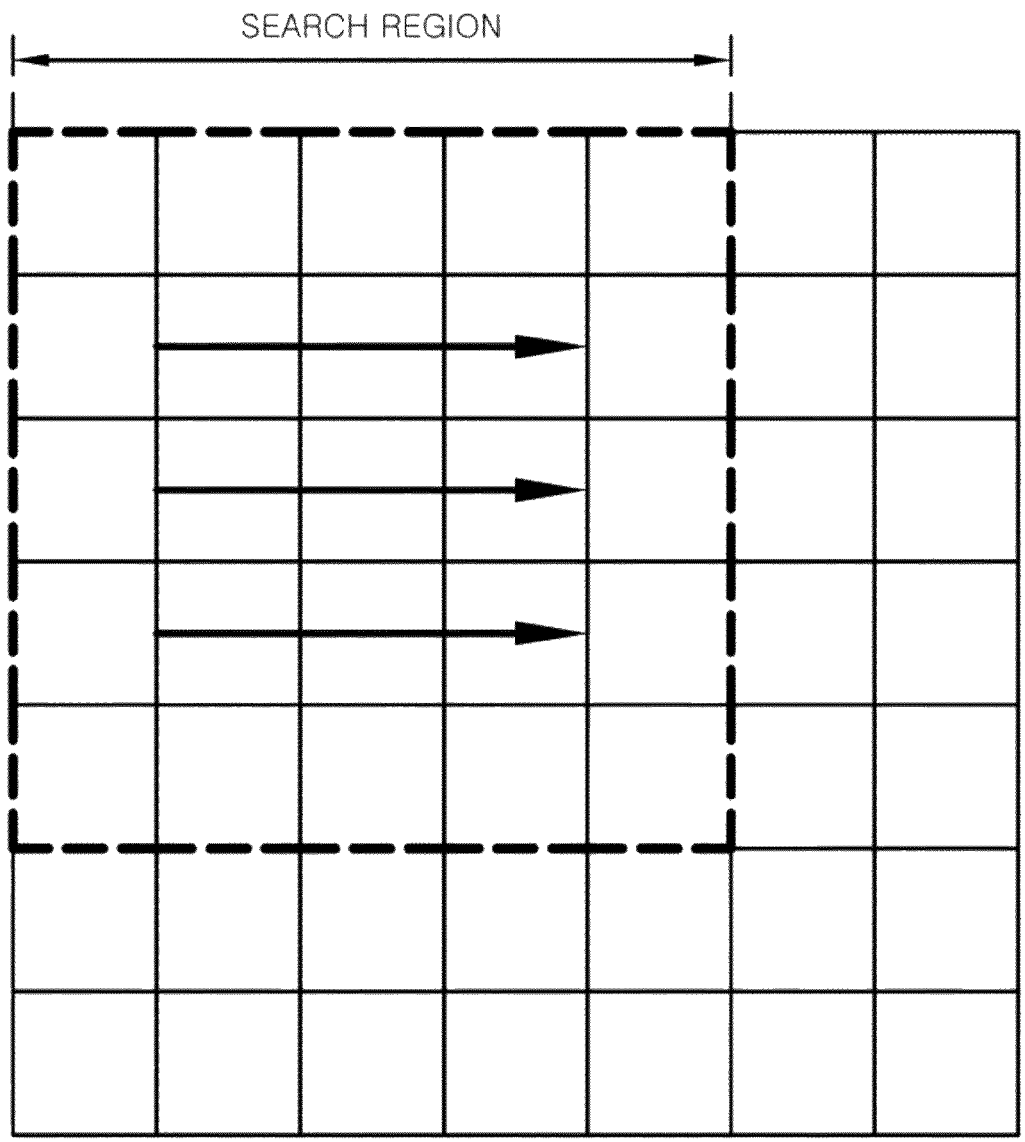
FIG. 9 is a view provided to explain a matching method for generating a motion vector component according to another embodiment.

FIG. 9 is a view provided to explain a matching method for generating a motion vector component according to another embodiment.

Referring to FIG. 9, in one embodiment, the stereo matching computations may be performed in planar parallel direction to extract the motion vector information, although the stereo matching computation according to the present invention is not limited to the specific example given above.

Figure 10:
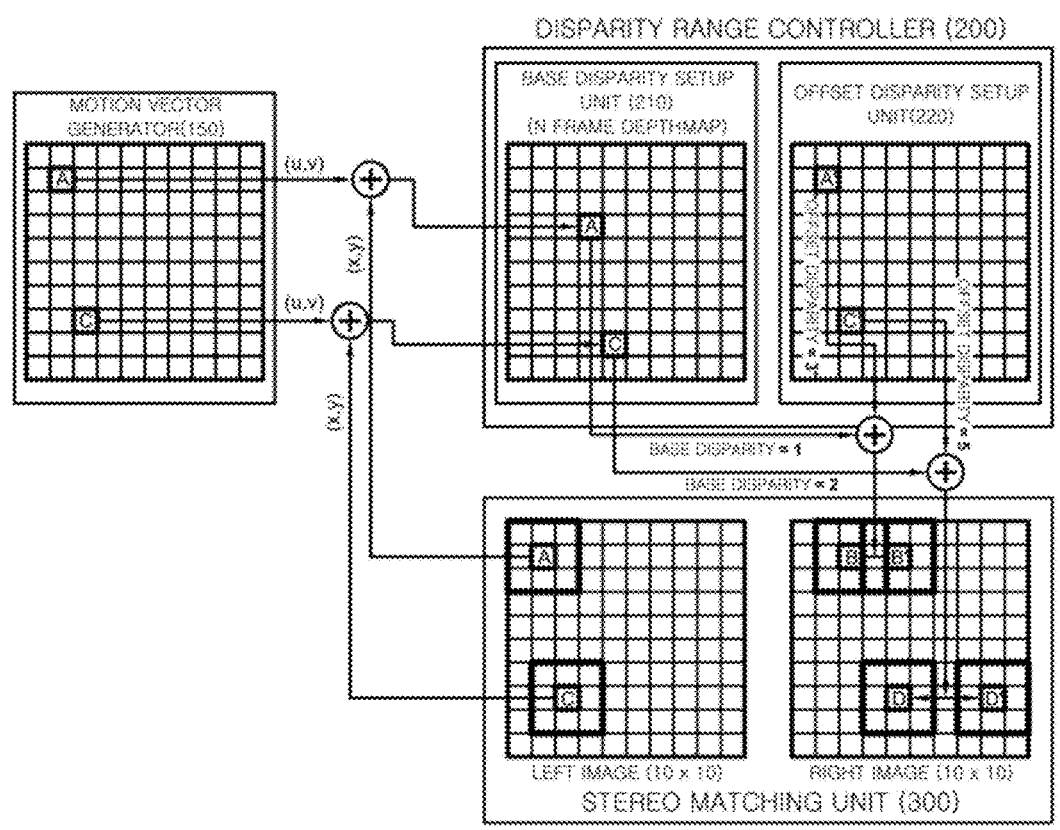
FIG. 10 is a view provided to explain a method for performing stereo matching computations at a stereo matching unit according to another embodiment.

FIG. 10 is a view provided to explain a method for performing stereo matching computations at a stereo matching unit according to another embodiment.

Referring to FIG. 10, in one embodiment, the disparity range controller 200 may set a disparity range by additionally using the extracted motion vector information. To be specific, in a preferred embodiment, when the disparity range controller 200 sets a disparity range by additionally utilizing the motion vector information, the disparity range controller 200 may set a base disparity value using current location (x, y) of the pixel, and coordinate information (x+u, v+y) which is the current location added with corresponding motion vector information (u, v).

Accordingly, the base disparity setup unit 210 may set a base disparity value using the depth map information and the motion vector information, and the offset disparity setup unit 220 may set an offset disparity value using the depth map information.

The method for performing stereo matching and other constitution will not be explained in detail below, but referred to the explanation provided above for the sake of brevity.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A system for stereo matching, comprising:
a depth map generator which generates depth map information based on a stereo matching result of a N frame image;
a disparity range controller which generates disparity range information using the depth map information; and
a stereo matching unit which performs stereo matching computations of N+1 frame image using the disparity range information,
wherein the disparity range controller comprises:
a base disparity setup unit which performs a series of filtering computations using the depth map information and sets a base disparity value based on the same; and
an offset disparity setup unit which performs a series of filtering computation using the depth map information and sets an offset disparity value based on the same.

2. The system of claim 1, wherein the disparity range controller performs a series of window-based filtering computations using the depth ma information.

3. The system of claim 1, wherein the disparity range controller further comprises:
an initial base disparity value range storage which stores a base disparity value range as initially set; and
an initial offset disparity value range storage which stores an offset disparity value range as initially set.

4. The system of claim 3, wherein the disparity range controller further comprises a depth map reliability determining unit which determines reliability of the depth map information.

5. The system of claim 4, wherein the disparity range controller comprises:
a first multiplexer (MUX) which may select an initial base disparity value range or a base disparity value as set at the base disparity setup unit, depending on the reliability of the depth map information; and
a second multiplexer (MUX) which may select an initial offset disparity value range or an offset disparity value as set at the offset disparity setup unit, depending on the reliability of the depth map information.

6. The system of claim 1, further comprising a motion vector generator which generates motion vector information using image information in a predetermined direction of N frame and N+1 frame, wherein the disparity range controller generates disparity range information by additionally using the motion vector information.

7. A system for stereo matching, comprising:
a depth map generator which generates depth map information based on a stereo matching result of a N frame image;
a disparity range controller which generates disparity range information using the depth map information;
a stereo matching unit which performs stereo matching computations of N+1 frame image using the disparity range information, and
a motion vector generator which generates motion vector information using image information in a predetermined direction of N frame and N+1 frame,
wherein the disparity range controller generates disparity range information by additionally using the motion vector information,
wherein the disparity range controller comprises:
a base disparity setup unit which performs a series of filtering computations using the depth map information and the motion vector information and sets a base disparity value based on the same;
an offset disparity setup unit which performs a series of filtering computations using the depth map information and sets an offset disparity value based on the same.

8. The system of claim 7, wherein the disparity range controller further comprises:
an initial base disparity value range storage which stores a base disparity value range as initially set; and
an initial offset disparity value range storage which stores an offset disparity value range as initially set.

9. The system of claim 8, wherein the disparity range controller further comprises a depth map reliability determining unit which determines reliability of the depth map information.

10. The system of claim 9, wherein the disparity range controller comprises:
a first multiplexer (MUX) which may select an initial base disparity value range or a base disparity value as set at the base disparity setup unit, depending on the reliability of the depth map information; and
a second multiplexer (MUX) which may select an initial offset disparity value range or an offset disparity value as set at the offset disparity setup unit, depending on the reliability of the depth map information.

* * * * *